C. G. WILDERSON.
VARIABLE FEED MECHANISM.
APPLICATION FILED MAY 25, 1910.
992,700.
Patented May 16, 1911.
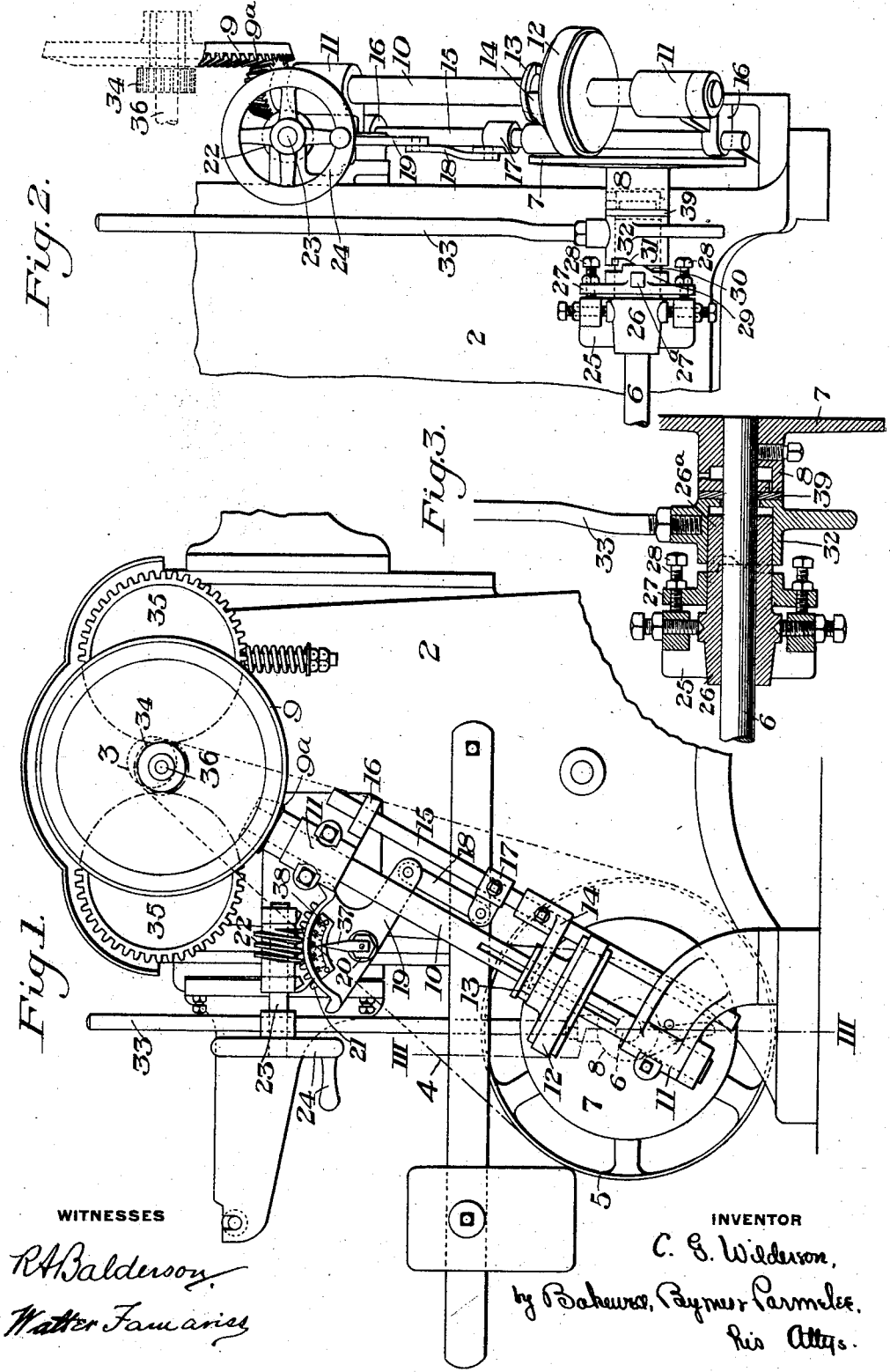
WITNESSES
R H Balderson
Walter Famaries
INVENTOR
C. G. Wilderson,
by Bakewell, Byrnes Parmelee
his Attys.

UNITED STATES PATENT OFFICE.

CLINTON G. WILDERSON, OF LEETONIA, OHIO, ASSIGNOR TO THE CRESCENT MACHINE COMPANY, OF LEETONIA, OHIO, A CORPORATION OF OHIO.

VARIABLE-FEED MECHANISM.

992,700.   Specification of Letters Patent.   Patented May 16, 1911.

Application filed May 25, 1910. Serial No. 563,421.

*To all whom it may concern:*

Be it known that I, CLINTON G. WILDERSON, of Leetonia, Columbiana county, Ohio, have invented a new and useful Variable-Feed Mechanism for Woodworking-Machines, of which the following is a full, clear, and exact description, reference being had to the accompanying drawings, forming part of this specification, in which—

Figure 1 is an end view of a planer having my invention applied thereto; and Fig. 2 is a front view of a portion of the same and showing the parts which embody the invention. Fig. 3 is a detail sectional view on the line III—III of Fig. 1.

My invention is designed to provide variable feed mechanism of a simple and convenient character for woodworking machines, such as planers, and by means of which either a slow feed, a fast feed, or any intermediate feed, may be instantly available by the simple operation of a hand wheel or other shifting device, and which changes can be readily effected while the machine is in operation. When the work to be done is of a common nature, a few turns of the hand wheel or controlling device will set the feed on high speed, with a marked saving in time. When extremely smooth work is desired, a few turns of the hand wheel in the opposite direction will set the feed on slow speed, and the work produced will be of a desired smoothness. If the rough lumber to be surfaced is not of uniform thickness, a slow speed may be used for the thicker pieces, thus avoiding the necessity for choking down the machine until the belts begin to slip, since the feed can be reduced according to the thickness of the cut being taken. In fact, the invention provides means whereby in any case the feed can be readily adjusted to suit the particular work being done.

The nature of the invention will be best understood by reference to the accompanying drawings, in which I have shown the preferred embodiment thereof, and which will now be described, it being premised, however, that various changes can be made in the details of construction and arrangement of the parts without departing from the spirit and scope of the invention as defined in the appended claims.

In these drawings, the numeral 2 designates the frame of a planer, which may be in general of any usual or well known type. 3 is a pulley connected to the planer shaft at the end opposite that shown in Fig. 1, and which may be driven by a connection with any suitable source of power. 4 is a belt connecting the pulley 3 with a belt wheel 5 on a countershaft 6 journaled at the lower front portion of the machine. This countershaft is provided at the end opposite the belt wheel 5 with a friction disk 7. This disk is carried by a hub 8, which is secured to the countershaft to rotate therewith.

Loosely mounted on a stud shaft 36 mounted on the frame 2 and upon the side of the planer opposite the pulley 3, is a large beveled gear wheel 9, which is adapted to be driven by a bevel pinion $9^a$ on the upper end portion of a shaft 10, journaled in suitable bearings 11 on the frame 2, and extending obliquely upward from the lower portion of the frame. Splined on this shaft to move up and down thereon, is a friction wheel 12 having a hub or collar 13, which is engaged by a fork 14 on a shifting rod 15, which is mounted in suitable guides 16 at one side of and substantially parallel with the shaft 10. Secured to the shifting rod 15 is a collar 17, which is connected by a link 18 with one arm of a lever 19 which is fulcrumed at 20 to the frame of the planer. The other arm of this lever is provided with a toothed segment 21 having worm teeth which engage the teeth of a worm 22, which is carried by a short shaft 23, having at one end a hand wheel 24.

25 is a plate or bracket, which is secured to the frame 2, or may be cast integral therewith, and which carries a bearing 26 for the countershaft 6, and is provided with a hub extension $26^a$. Placed around said hub $26^a$ adjacent to the bearing 26 is an adjusting member 27, which, by means of the adjusting screws 28, can be moved toward or away from the bearing 26, and $27^a$ is a set screw for securing the member 27 to the hub $26^a$. This member 27 is provided with a hub portion 29 having a cam face 30, which is designed to coöperate with a cam face 31 on a sleeve or collar 32, which is loosely mounted on the hub $26^a$, between the adjusting member 27 and an anti-friction washer 39 in contact with the hub 8 of the friction disk 7. The sleeve 32 is provided with an upwardly extending operating lever 33.

The bevel gear wheel 9 has attached thereto a toothed pinion 34, which meshes with the teeth of the spur gear wheels 35 and 35 which drive the usual feed rolls, not shown.

Mounted on the fulcrum 20 of the lever 19, is a pointer 37, which coacts with a scale 38 on the lever 19, to indicate to the operator the position of the friction wheel 12 with relation to the center of the disk 7. By the use of the scale and indicator, the operator is enabled to set the friction wheel at the desired point to give the predetermined feed for different classes of work.

The operation is as follows:—When the lever 33 is moved to the position shown in Fig. 2, the cam faces 30 and 31 coöperate with each other to force the sleeve 32 to the right (looking at Fig. 2), thereby forcing the friction disk 7 into driving contact with the periphery of the friction wheel 12. This effects the rotation of the oblique shaft 10, and thereby of the bevel gear wheel 9 and feed roller driving gears 35. As before stated, the friction wheel 12 is movable up and down on the shaft 10, this movement being radial with respect to the friction disk 7, so that the wheel 12 may be caused to engage the face of the disk 7 at different distances from the center of said disk, thereby varying the speed of rotation of the wheel 12, shaft 10, and feed roller actuating gears. This adjustment of the wheel 12 can be quickly effected without stopping the machine by the operation of the hand wheel 24 which actuates the worm and thereby the toothed segment 21 of the lever 19. This lever in turn actuates the shifting rod 15.

The adjusting member 27 is provided for the purpose of taking up wear which may occur between the friction gear 12 and disk 7. All that is required in order to compensate for such wear is to slacken the set screw 27ᵃ and actuate the adjusting screws 28 to move the adjusting member farther away from the bearing 26 so as to thereby move the friction disk outwardly to a greater extent when the lever 33 is actuated. The member 27 is then secured to hub 26ᵃ by means of the set screw 27ᵃ to retain it in its adjusted position.

The feed may be stopped entirely at any time by actuating the lever 33 to cause the high points of the cam surfaces 30 and 31 to ride out of contact with each other and thereby releasing the driving pressure between the friction disk and friction wheel.

The invention provides a variable feed mechanism of an extremely simple, convenient, and reliable character by means of which the feed of the machine may be varied without stopping it to suit the particular work being done.

It will be obvious that various changes may be made in the details of construction and arrangement of the parts. Thus, the means for shifting the friction wheel relatively to the friction disk can be varied in detail; any desired arrangement of gearing driven by the friction wheel 12 may be used for actuating the feed rollers; the means for compensating for wear of the friction driving elements may be varied; and other changes may be made within the scope of the appended claims.

What I claim is:—

1. In variable drive stock feeding mechanism for wood working machines, a driving shaft, an endwise movable friction disk thereon, a driven shaft, a friction wheel adjustably secured thereto and movable thereon to engage the friction disk at different distances from the center thereof, a shifting rod parallel to the driven shaft, connections between the friction wheel and the rod for moving the friction wheel, means for shifting the rod, and adjusting screws for shifting the friction disk to compensate for wear; substantially as described.

2. In variable drive stock feeding mechanism for wood working machines, a driving shaft, an endwise movable friction disk thereon, a driven shaft, a friction wheel adjustably secured thereto and movable thereon to engage the friction disk at different distances from the center thereof, a shifting rod parallel to the driven shaft, connections between the friction wheel and the rod for moving the friction wheel, and means for shifting the rod, adjusting screws for shifting the friction disk to compensate for wear, and a movable cam for releasing the driving engagement between the friction disk and friction wheel; substantially as described.

3. In a wood working machine, a driving shaft, a friction disk mounted on said shaft for endwise movement, a driven shaft, a friction wheel adjustably mounted on said shaft and arranged to engage the face of the friction disk at different distances from the center thereof, feed actuating gearing actuated by the driven shaft, a shifting rod parallel with the driven shaft, a fork connected to the rod and engaging the friction wheel, a lever connected to the shifting rod and having a toothed segment, and a worm engaging said segment for shifting and holding the friction wheel in its adjusted position; substantially as described.

4. In a wood working machine, a driving shaft, a bearing for said shaft, a friction disk on said shaft arranged for endwise movement and having a hub portion, a sleeve member rotatably mounted on said bearing and adapted to engage said hub portion and having actuating means connected thereto, feed driving mechanism, a relatively fixed bearing member adjacent to the sleeve member, said bearing member and sleeve member having coöperating cam portions arranged to force the friction disk into engagement with the feed driving mechanism when in engagement with each other and means for adjusting the relatively fixed bearing member; substantially as described.

5. In a wood working machine, a driving shaft, a friction disk on said shaft arranged for endwise movement and having a hub portion, a sleeve member rotatably mounted on said bearing and adapted to engage said hub portion and having actuating means connected thereto, feed driving mechanism, a relatively fixed bearing member adjacent to the sleeve member, said bearing member and sleeve member having coöperating cam portions arranged to force the friction disk into engagement with the feed driving mechanism when in engagement with each other, and means for adjusting the relatively fixed member toward or away from the sleeve member; substantially as described.

6. In a variable feed mechanism of the character described, a driving shaft, a friction disk mounted thereon, a driven shaft, a friction wheel adjustably secured thereto and movable thereon to engage the friction disk at different distances from the center thereof, a rotary member for moving the friction wheel, an index connected thereto, and a stationary pointer co-acting with the index for indicating the position of said wheel; substantially as described.

7. In a variable drive, stock feeding mechanism for wood working machines, a driving shaft, a friction disk mounted thereon, a driven shaft, a friction wheel adjustably secured thereto and movably mounted thereon to engage the friction disk at different distances from the center thereof, a shifting rod parallel to the driving shaft and arranged to be shifted longitudinally, a fork connected to the rod and engaging the friction wheel, a lever having a toothed segment, a link connection between the lever and rod, a worm engaging said segment arranged to actuate the rod, an index on the lever, and a pointer mounted on the fulcrum pin of the lever arranged to coact with the index to indicate the position of the friction wheel; substantially as described.

In testimony whereof, I have hereunto set my hand.

CLINTON G. WILDERSON.

Witnesses:
JESSIE J. GALLAGHER,
JOHN B. MORGAN.

---

Copies of this patent may be obtained for five cents each, by addressing the "Commissioner of Patents, Washington, D. C."